United States Patent [19]

Meixner

[11] Patent Number: 4,479,390
[45] Date of Patent: Oct. 30, 1984

[54] TRANSDUCER FOR MEASURING TORQUE AND/OR SPEED OF ROTATING SHAFT

[75] Inventor: Edwin J. Meixner, Mt. Prospect, Ill.

[73] Assignee: Borg-Warner Corporation, Chicago, Ill.

[21] Appl. No.: 461,897

[22] Filed: Jan. 28, 1983

[51] Int. Cl.³ .............................................. G01L 3/10
[52] U.S. Cl. .............................. 73/862.36; 73/DIG. 2
[58] Field of Search ......... 73/862.28, DIG. 2, 862.36, 73/779; 324/209

[56] References Cited

U.S. PATENT DOCUMENTS

| | | | |
|---|---|---|---|
| 4,100,794 | 7/1978 | Meixner | 73/862.28 |
| 4,106,334 | 8/1978 | Studtmann | 73/862.28 |
| 4,306,462 | 12/1981 | Meixner | 73/862.28 X |
| 4,406,168 | 9/1983 | Meixner | 73/862.28 X |

Primary Examiner—Charles A. Ruehl
Assistant Examiner—James R. Giebel
Attorney, Agent, or Firm—James E. Tracy

[57] ABSTRACT

A magnetic transducer fits over and encompasses a rotatable shaft and has a primary or excitation magnetic assembly having a winding arrangement that is energized to provide a-c excitation for producing an alternating magnetic flux or field, adjacent to and within the shaft, which is modified as the shaft is torsionally stressed when torque is applied thereto. This stressing causes compression and tension in the shaft which alter the shaft permeability and thus vary the magnetic flux pattern in the shaft. The resulting or modified magnetic field is also a function of the shaft speed due to the shaft's armature reaction, eddy currents being generated in the shaft which develop a counter magnetic field that opposes and distorts the field produced by the primary winding arrangement. A pair of secondary or pick-up magnetic assemblies, having secondary windings, respond to the modified magnetic field and provide information signals relative to the torque and speed characteristics of the rotating shaft. The size, weight, cost and complexity of the transducer are substantially reduced by constructing the three magnetic assemblies so that the primary and secondary windings are effectively wrapped around the shaft with the winding turns and the shaft sharing the same axis, the magnetic field thereby being parallel to the shaft. Relatively short poles extend radially inwardly from the magnetic assemblies toward the shaft to control the magnetic flux paths and maximize the amount of flux passing through the shaft.

9 Claims, 6 Drawing Figures

TRANSDUCER FOR MEASURING TORQUE AND/OR SPEED OF ROTATING SHAFT

BACKGROUND OF THE INVENTION

This invention relates to a magnetic transducer for sensing changes in permeability of a rotatable shaft to determine its speed and torque.

Systems have been developed having a magnetic transducer, which encompasses a rotating shaft and has primary and secondary windings, for producing an alternating magnetic field adjacent to and within the shaft and for measuring the changes in that magnetic field to provide information regarding different shaft characteristics, such as speed, torque and horsepower, the transducer essentially acting like a transformer. It has been known that as a driven or loaded shaft is torsionally stressed, compression and tension occur in various portions of the shaft and this changes the shaft permeability and consequently the magnetic flux pattern in the shaft thereby to alter the magnetic field. A torque information signal may be developed from the altered or resulting magnetic field. Such a detecting system is disclosed in U.S. Pat. No. 4,100,794, issued July 18, 1978 in the name of Edwin J. Meixner, and which is assigned to the assignee of the present invention. In addition, it is recognized in the Meixner patent that the magnetic field also varies as a function of the shaft speed due to the armature reaction in the shaft. Eddy currents will flow on the surface of the rotating shaft and produce a counter magnetic field which opposes and distorts the original magnetic field. The faster the rotational speed, the greater the eddy current flow and the greater the amount of field distortion. As a result, the modified magnetic field may also be used to generate a speed information signal.

The required alternating magnetic field is produced in the transducer in U.S. Pat. No. 4,100,794—Meixner by a primary or excitation magnetic assembly comprising a circular magnetic core which encompasses the rotatable shaft and has a series of radially inwardly extending poles whose free ends are in close proximity to the shaft. A primary winding including a corresponding series of series-connected winding coils is wound on the magnetic core, each of the coils being disposed on a respective one of the radial poles such that the axis of each winding turn is perpendicular to the shaft. An a-c voltage source is coupled to the multi-coil primary winding for translating alternating current to the winding to develop an alternating magnetic flux adjacent to and within the shaft, the magnetic field produced by the primary winding thereby being perpendicular to the shaft. In accordance with the Meixner patent, the bidirectional current flow in the primary winding, needed to provide the necessary a-c excitation, may also be developed by converting d-c to a-c by means of a bridge-type inverter or a similar switching arrangement. A pair of secondary or pick-up magnetic assemblies, of construction similar to the primary assembly, respond to the resulting magnetic field, which has been modified by the torque and speed characteristics of the shaft, to provide information signals in U.S. Pat. No. 4,100,794 indicating those sensed characteristics.

An improved excitation system for the transducer is disclosed in U.S. Pat. No. 4,106,334, issued Aug. 5, 1978 in the name of George H. Studtmann, and assigned to the present assignee. In the detecting system shown in the Studtmann patent, two multi-coil primary windings are wound in a bifilar arrangement on the primary magnetic assembly. Each of the radial poles has two coils wound thereon, one coil from each of the two primary windings. The two coils on each pole are physically adjacent to each other, but are electrically isolated or insulated from each other. With this driving scheme, bidirectional current flow is not needed and a simple switching circuit may be utilized to supply, from a direct voltage source, direct current pulses alternately to the two primary windings. In this way, when a d-c pulse is translated to one primary winding the other primary winding will be ineffective and all of the poles will be magnetized with one polarity, whereas when a d-c pulse is then supplied to the other primary winding the first winding will be inoperative and all of the poles will be magnetized with the opposite polarity. As a consequence, the d-c pulses will produce an alternating magnetic flux or field in the central area of the magnetic core through which the rotating shaft extends.

A similar transducer, with different output signal processing circuitry, is found in U.S. Pat. No. 4,306,462, issued Dec. 22, 1981 in the name of Edwin J. Meixner, and assigned to the assignee of the present invention.

The magnetic transducer of the present invention may be substituted for the transducers employed in the detecting systems disclosed in U.S. Pat. Nos. 4,100,794, 4,106,334 and 4,306,462 in order to obtain significant cost savings. A substantial improvement and a meritorious advance over the transducers of those patents is achieved, since the present transducer is considerably smaller and requires much less space, weighs significantly less, requires fewer winding coils, may be fabricated of stamped parts, and utilizes magnetic material much more efficiently. Moreover, the transducer of the present invention permits design flexibilities not available with the prior transducers. For example, a greater number of poles may be employed, if desired. As another example, the number of poles is not determined by the number of winding coils. The number of coils is independent of the number of poles.

SUMMARY OF THE INVENTION

The invention provides a transducer for sensing a predetermined characteristic, such as torque or speed, of a rotatable shaft and includes a primary magnetic assembly, having a primary winding, energized by an applied excitation signal to produce an alternating magnetic field adjacent to and within the shaft, which field is a function of and is modified by the sensed shaft characteristic. The transducer further includes first and second secondary magnetic assemblies, having secondary windings, for producing signals in response to the modified magnetic field to provide information signals indicating the sensed shaft characteristic. In accordance with the invention, each of the magnetic assemblies comprises a hollow, ring-shaped magnetic shell encompassing and coaxial with the rotatable shaft, the two sides of the shell being closed and joined at the shell's radially outermost rim, while the two sides are separated and the shell is open at the shell's radially innermost rim, the shell thereby having a U-shaped cross-section. At least one winding is positioned within the magnetic shell, the plane defined by each winding turn being perpendicular to the axis of the rotatable shaft. Each of the magnetic assemblies also comprises a plurality of relatively short poles extending radially inwardly from the innermost rim on each side of the shell, the free ends of the poles being close enough to the shaft so that magnetic circuit paths will be established through both the shell and the shaft.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

FIG. 2 is considered the front view of the transducer;

DESCRIPTION OF THE PREFERRED EMBODIMENT

Figure 1:
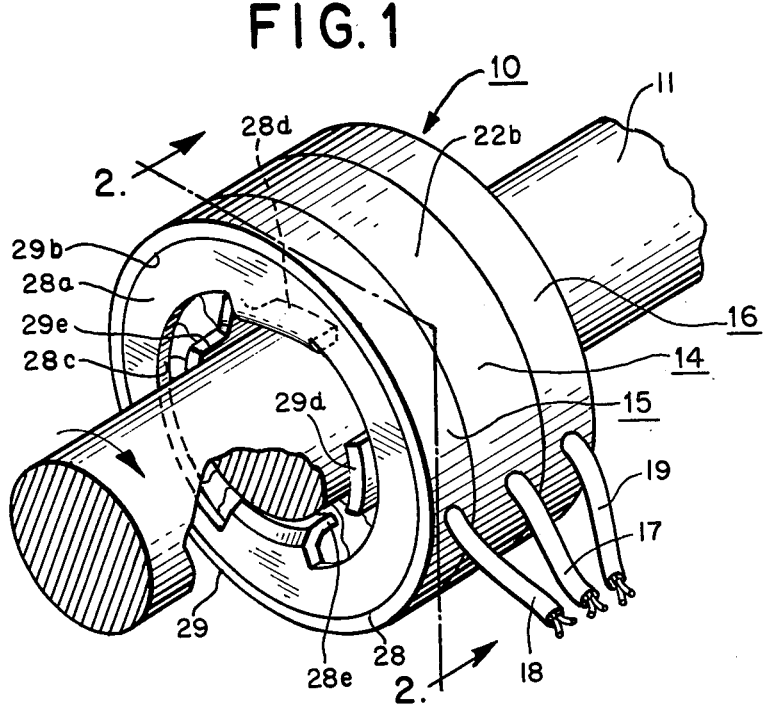
FIG. 1 is a perspective, and partially broken away, view of a transducer, having a primary and two secondary magnetic assemblies and constructed in accordance with the invention, and the manner in which the transducer fits over and encompasses a rotating shaft in order to measure the shaft's torque and speed characteristics.
Figure 2:
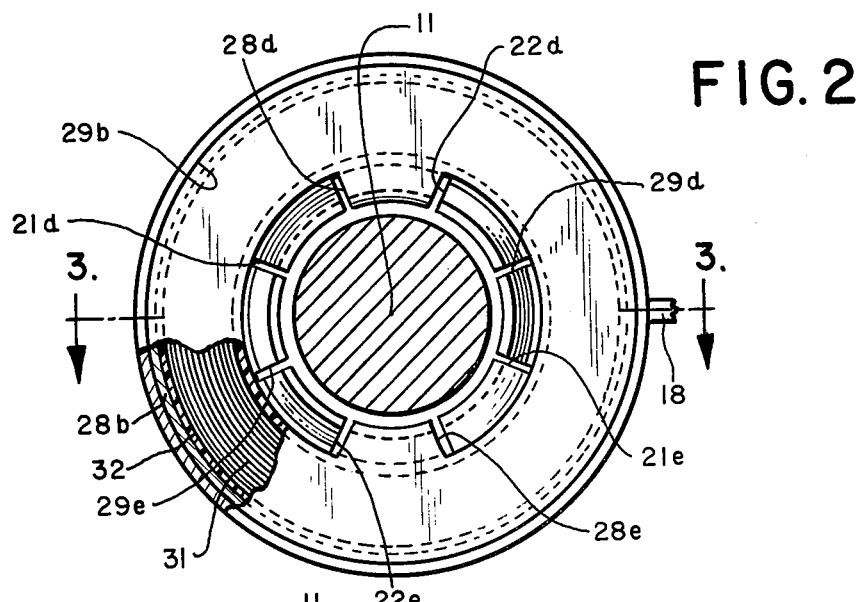
FIG. 2 is a plan, and partially broken away, view of the transducer, the shaft being shown in section, and is taken along section line 2—2 in FIG. 1; for convenience.
Figure 3:
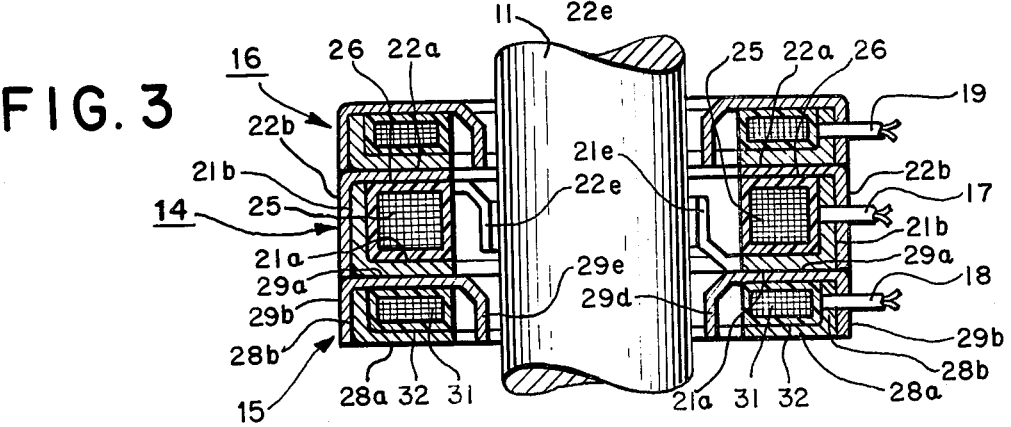
FIG. 3 is a fragmentary sectional view of the transducer taken along section line 3—3 in FIG. 2, and shows the primary or excitation magnetic assembly sandwiched between the two secondary or pick-up magnetic assemblies.

FIG. 1 depicts the manner in which the magnetic transducer 10 of the invention is positioned around the rotatable shaft 11 whose torque and speed characteristics are to be sensed. The means for driving the shaft and the load driven by the shaft are not indicated, as they are not important for understanding the invention. For example, and as taught in the aforementioned U.S. patents, the transducer may sense the torque and speed of one of the drive components in a motor vehicle. Thus, to sense driveline torque and speed the transducer 10 may be mounted over a portion of the output shaft which extends from the transmission housing and is usually coupled to a universal joint for delivering torque to the drive wheels of the vehicle.

As is the case with the transducers disclosed in the aforementioned U.S. patents, transducer 10 includes three basic components, a primary or excitation magnetic assembly 14, and a pair of secondary or pick-up magnetic assemblies 15 and 16, assembly 14 being mounted between assemblies 15 and 16. The three assemblies 14, 15 and 16 may be held together by any suitable means, such as by screws. No such mounting means is shown to simplify the drawings. Since assembly 15 is at the front of the transducer 10, it will be referred to as the front secondary magnetic assembly while assembly 16 will be called the back or rear secondary magnetic assembly. As will become apparent, primary assembly 14 includes at least one primary winding for producing a-c excitation to create the required alternating magnetic field adjacent to and within the portion of shaft 11 that extends through transducer 10. It will also be made apparent that each of secondary assemblies 15 and 16 contains a secondary winding for providing a pair of output information signals which relate to the speed and torque characteristics of the rotatable shaft 11. Since energizing or driving circuitry for primary assembly 14 and signal processing output circuitry for secondary assemblies 15 and 16 are fully disclosed in the aforementioned U.S. patents, such circuitry has not been illustrated to avoid encumbering the drawings. Reference is therefore made to those U.S. patents to understand the manner in which transducer 10 is incorporated in a complete detecting system for producing speed-indicating and torque-indicating signals. Those aforementioned patents also suggest various uses for the information found by the detecting system. For example, the speed-indicating signal may be used to actuate an odometer or a speedometer. On the other hand, the torque-indicating signal may be employed to regulate the change of gear ratio in an automatic transmission. The connections from the driving circuitry to the primary winding arrangement is made via cable 17, while the connections from the secondary windings are accomplished over cables 18 and 19. Although cable 17 is illustrated as a conductor pair, three separate conductors would of course be required if two bifilar connected primary windings were employed.

Figure 4:
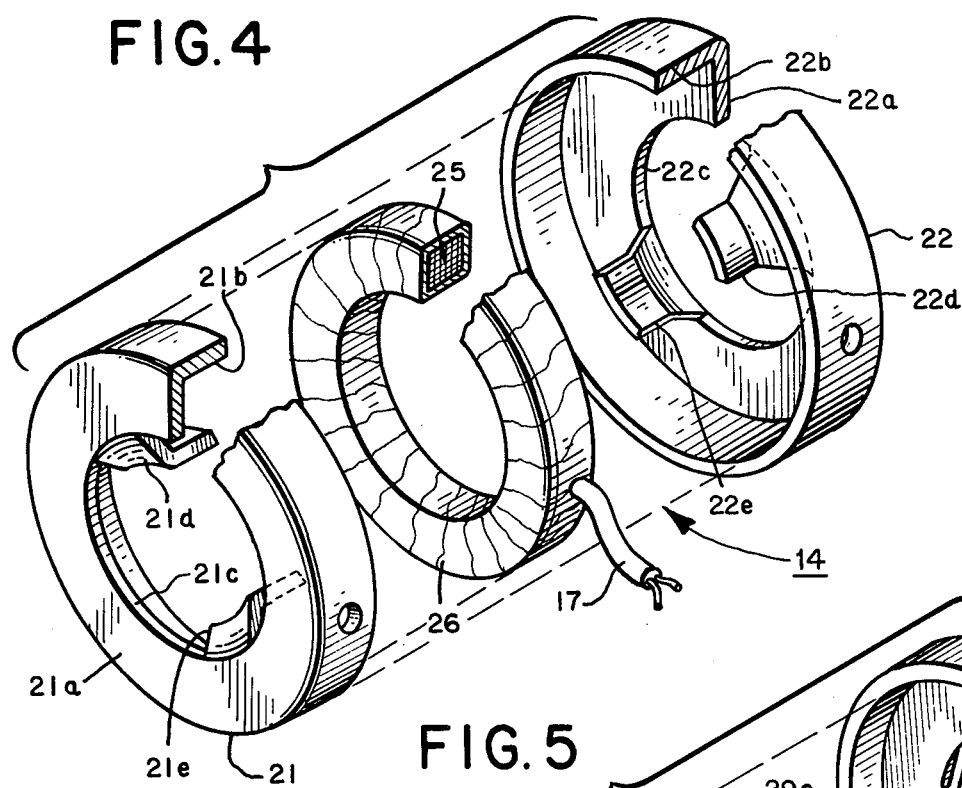
FIG. 4 is an exploded and partially broken away perspective view of the primary magnetic assembly.

Turning now to the details of transducer 10, it will be observed in the drawings that each of assemblies 14, 15 and 16 is basically of the same construction. Consideration will initially be given to the primary magnetic assembly 14 which is shown by itself in FIG. 4. Assembly 14 comprises a hollow, ring-shaped or toroidal-shaped magnetic shell, formed of two parts 21 and 22, which encompasses and is coaxial with the rotatable shaft 11, the two sides of the shell (designated by the reference numbers 21a and 22a) being closed and joined at the shell's radially outermost rim by annular flange portions 21b and 22b of parts 21, 22 respectively, while the two sides are separated and the shell is open at the shell's radially innermost rim formed by the circular edges 21c and 22c, shell 21, 22 thereby having a U-shaped cross-section. More specifically, the shell is formed of two annular-shaped rings 21, 22 having L-shaped cross-sections and sized so that one ring (21) telescopes and nests within the other ring (22), the assembled rings having a U-shaped cross-section with the outermost rim forming the closed part of the U while the shell's innermost rim provides the opening of the U.

Figure 6:
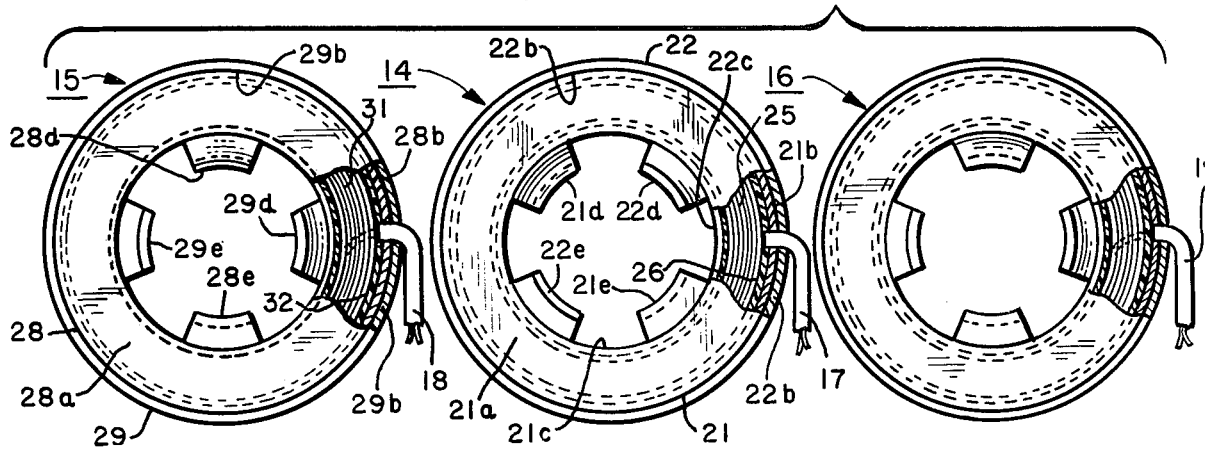

Extending radially inwardly from the innermost rim on each side of shell 21, 22 are a plurality of relatively short poles equally spaced around the rim, the free ends of the poles being in close proximity to the rotating shaft 11. More particularly, poles 21d and 21e, spaced apart by 180°, extend from side 21a of shell 21, 22, while poles 22d and 22e, also spaced apart by 180°, extend radially inwardly from side 22a of the shell. The length of each pole need only be long enough to present a distinct pole separate from the remainder of the inner rim. Note that the poles on one side are angularly offset and oriented with respect to the poles on the other side in order that each pole on each side is positioned midway between, and thereby 90° from, the two poles on the other side. This is best seen in FIG. 6.

The poles 21d, 21e, 22d and 22e not only extend radially inwardly from sides 21a and 22a, but they are also shaped so that the free ends of all four poles are effectively aligned in the same plane and along the same circumference of the rotatable shaft. Furthermore, the free ends of the poles are arcuately shaped to provide arcuate or curved surfaces that conform to the curvature of the shaft. As will be appreciated, it is important that the curved surfaces of the free ends of the poles be as close to shaft 11 as practicable in order for magnetic flux to pass through the shaft.

Although only two poles extend from each side of shell 21, 22, any desired number, odd or even, may be provided. Preferably, each side will have the same number of poles equally spaced around the innermost rim of the shell.

At least one primary winding 25, depending on the energizing circuitry to which cable 17 connects, lies within magnetic shell 21, 22, each winding turn looping or surrounding the rotating shaft, the plane defined by each turn thereby being perpendicular to the axis of the shaft. Of course, winding coil 25 may comprise a very large number of individual winding turns in order that a substantial magnetic field may be created. Insulation material 26 is wrapped around winding 25. With this arrangement, when winding 25 is a-c excited an alternating magnetic field or flux will be developed around the winding and, since shell 21, 22 is made of magnetic material, most of this magnetic field will effectively be confined or guided by the shell and by poles 21d, 21e, 22d and 22e so that the magnetic circuit paths will include parts of shaft 11. In this way, the magnetic flux will pass from a pole on one side of the shell, through and adjacent to a portion of shaft 11, and then to a pole on the other side of the shell. Without the poles, shell 21, 22 may be likened to a series of U-shaped horseshoe magnets arranged in a circle such that the central or common portions of the horseshoe magnets form the outermost rim 21b, 22b of the shell and the free ends of the magnets provide the circular edges 21c and 22c, between which edges the magnetic flux flows. With the poles, the magnetic circuit or flux paths from one circular edge to the other may be controlled so that most of the flux will travel through shaft 11.

To explain further, when primary winding 25 creates an alternating magnetic field, the poles alternate between North and South polarities, poles 21d and 21e being North when poles 22d and 22e are South, and vice versa. When, for example, poles 21d and 21e are North, the magnetic flux will travel from those poles and around through portions of shaft 11 in a circumferential direction to poles 22d and 22e which will have a South polarity. Hence, the axial magnetic field is initially bent to a radial direction by the poles and then to a circumferential direction by the shaft. The alternating magnetic field that flows circumferentially through and adjacent to the shaft 11 will be of sufficient magnitude to induce signals, in the secondary windings of secondary magnetic assemblies 15 and 16, that may be conveyed over cables 18 and 19 and processed by the circuitry disclosed in the U.S. patents referred to hereinbefore. The magnetic field, produced adjacent to and within shaft 11, will be a function of and will be modified by the rotational speed of shaft 11 and by the torque applied to the shaft. In other words, the alternating magnetic flux produced by the excitation of primary winding 25 is altered as the shaft speed and/or torsional stresses in the shaft change. The resulting or modified magnetic field induces signals in the pick-up or secondary windings to provide signals bearing information regarding the torque and speed characteristics of shaft 11. These information signals may be processed by the circuitry shown in the aforementioned U.S. patents to provide, for example, visual indications of the shaft speed and torque.

Since the secondary magnetic assemblies 15 and 16 are obviously of the same general construction as primary assembly 14, only one of the secondary assemblies will be described, and the description will be very brief. Of course, as is apparent in the drawings, the physical size of primary assembly 14 is larger than that of assemblies 15 and 16. This is usually preferred in order that the alternating magnetic field established by the primary assembly will be adequate to induce the necessary information signals in the secondary windings.

Figure 5:
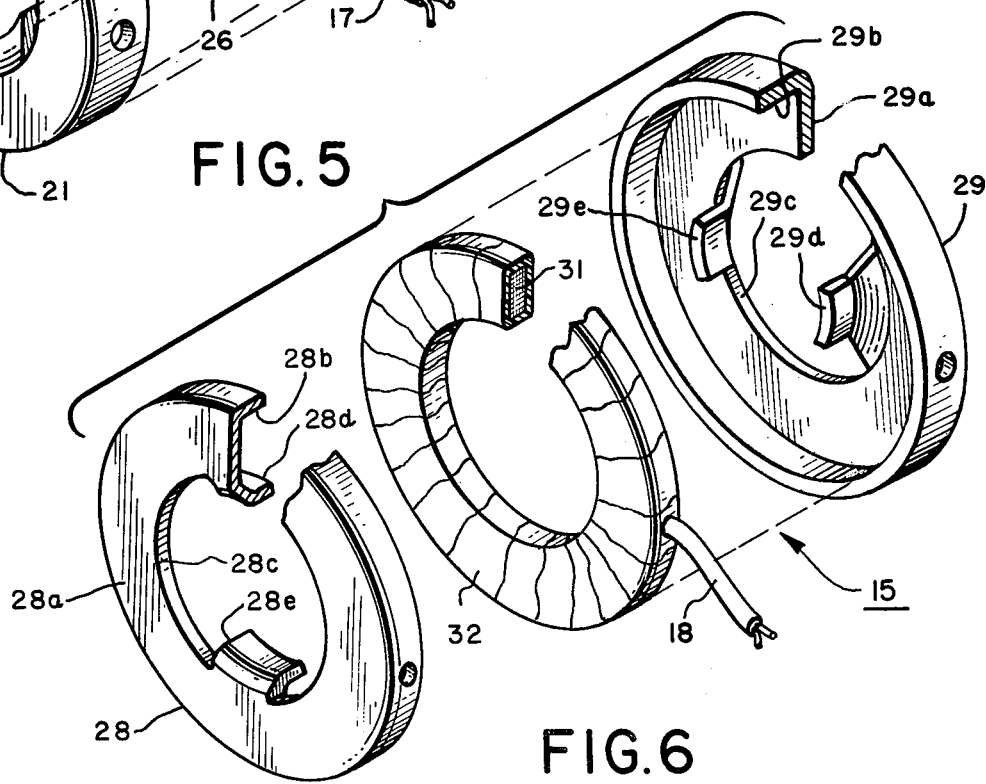
FIG. 5 is an exploded and partially broken away perspective view of the front secondary magnetic assembly; and, FIG. 6 is a front or plan view of each of the three magnetic assemblies, the assemblies on the left and right being the front and rear secondary assemblies respectively, while the primary assembly is in the middle.

Turning now to the front secondary assembly 15, shown by itself in FIG. 5, it will be seen that the assembly, which encompasses and is coaxial with the shaft 11, also includes a hollow, ring-shaped outer shell made of magnetic material and formed of two annular rings 28, 29 having L-shaped cross-sections and dimensioned so that ring 28 telescopes into and nests within ring 29, the assembled shell 28, 29 having two sides 28a and 29a which are effectively closed and joined at the shell's radially outermost rim by the annular flange portions 28b and 29b. The two sides 28a and 29a are open at the shell's radially innermost rim, defined by circular edges 28c and 29c. A pair of short poles 28d and 28e extend radially inwardly from the innermost rim on side 28a and a pair of short poles 29d and 29e extend toward the shaft on side 29a, the curved free ends of the poles being close enough to, and will conform to the curvature of, shaft 11 so that magnetic circuit paths will be established through both the shell and the shaft. The poles are appropriately shaped so that the curved surfaces are all aligned along the same circumference of shaft 11. As is the case with the primary assembly 14, the two poles on each side of shell 28, 29 are spaced apart by 180°, and the poles on one side are so oriented relative to the poles on the other side that each pole on each side lies midway between, or 90° from, two adjacent poles on the other side. This is best seen in FIG. 6. A single secondary winding 31, around which is wrapped a layer of insulating material 32, is disposed within magnetic shell 28, 29 and is wound with its winding turns encircling shaft 11, the plane of each turn thus being perpendicular to the shaft's axis.

It is to be noted in FIG. 6 that the corresponding poles of secondary assemblies 15 and 16 are aligned with each other. On the other hand, in the preferred embodiment the poles of primary assembly 14 are angularly offset with respect to the poles of the secondary assemblies, each primary pole being positioned halfway between the adjacent two pairs of aligned secondary poles.

It is to be appreciated that while each of the three shells is formed of two component parts, each shell could be made as a single unit. It is, of course, much easier to insert a winding inside of a shell when the shell comprises two pieces rather than one.

Although not illustrated in the drawings, non-magnetic conducting spacers, such as aluminum layers, may be employed to minimize the direct coupling between the primary and secondary windings. Preferably, the signals induced in the secondary windings should be determined primarily by the resulting magnetic field in the shaft, as modified by the speed and torque characteristics.

It will thus be realized that the present invention is of considerably simpler and less expensive construction than the prior transducers, where relatively long radial poles and a much greater number of windings are needed, an individual winding coil being required on each pole. The size of the present transducer, and particularly its diameter, is considerably smaller and its weight is much less than the prior transducers. Additionally, substantially less magnetic material is needed. Moreover, the magnetic shells of the present transducer may easily be fabricated by stamping operations. Furthermore, there is wide flexibility as to the number of poles employed, and that number is independent of the number of winding coils needed, which may be as few as three, one primary and two secondary windings.

While a particular embodiment of the invention has been shown and described, modifications may be made, and it is intended in the appended claims to cover all such modifications as may fall within the true spirit and scope of the invention.

I claim:

1. A transducer for sensing a predetermined characteristic of a rotatable shaft and including a primary magnetic assembly, having a primary winding, energized by an applied excitation signal to produce an alternating magnetic field adjacent to and within the shaft, which field is a function of and is modified by the sensed shaft characteristic, and further including first and second secondary magnetic assemblies, having secondary windings, for producing signals in response to the modified magnetic field to provide information signals indicating the sensed shaft characteristic, each of said magnetic assemblies comprising:

a hollow, ring-shaped magnetic shell encompassing and coaxial with the rotatable shaft and having two sides, a radially outermost rim and a radially innermost rim, the two sides of the shell being closed and joined at the shell's radially outermost rim, while the two sides are separated and the shell is open at the shell's radially innermost rim, the shell thereby having a U-shaped cross-section;

at least one winding within said magnetic shell, the plane defined by each winding turn being perpendicular to the axis of the rotatable shaft;

and a plurality of relatively short poles extending radially inwardly from the innermost rim on each side of the shell, the free ends of the poles being close enough to the shaft so that magnetic circuit paths will be established through both the shell and the shaft.

2. A transducer according to claim 1 wherein the predetermined shaft characteristic is the torque of the rotatable shaft, the alternating magnetic field being altered as the torsional stresses in the shaft change.

3. A transducer according to claim 1 wherein the primary magnetic assembly includes two primary windings, within said shell, wound in a bifilar arrangement.

4. A transducer according to claim 1 wherein the free end of each of said poles is arcuately shaped to provide a curved surface that conforms to the curvature of the rotatable shaft.

5. A transducer according to claim 1 wherein the free ends of said poles are shaped to provide arcuate surfaces aligned in the same plane and along the same circumference of the rotatable shaft.

6. A transducer according to claim 1 wherein said shell is formed of two parts, one part including one of the two sides while the other part includes the other side.

7. A transducer according to claim 1 wherein said shell is formed of two annular-shaped rings having L-shaped cross-sections and sized so that one ring telescopes into and nests within the other ring, the assembled rings thereby having a U-shaped cross-section with the outermost rim forming the closed part of the U while the shell's innermost rim provides the opening of the U.

8. A transducer according to claim 1 wherein each side of said shell has the same number of poles equally spaced around the innermost rim, the poles on one side being angularly offset and oriented with respect to the poles on the other side such that each pole on each side is positoned midway between two adjacent poles on the other side.

9. A transducer according to claim 1 wherein each side of said shell has two poles spaced 180° apart around the innermost rim, the poles on one side being angularly offset and oriented with respect to the poles on the other side such that each pole on each side is positioned midway between, and thereby 90° from, the two poles on the other side.

* * * * *